3,769,248
STARCH DERIVATIVE PROTECTIVE COLLOIDS IN EMULSION POLYMER SYSTEMS
Leslie P. Kovats, Granite City, Ill., assignor to Anheuser-Busch, Incorporated, St. Louis, Mo.
No Drawing. Filed Oct. 6, 1971, Ser. No. 187,146
Int. Cl. C08d 9/06
U.S. Cl. 260—17.4 ST 8 Claims

ABSTRACT OF THE DISCLOSURE

This application concerns aqueous vinyl acetate polymer and copolymer emulsions stabilized with starch based colloid forming substances, specifically hydroxyethyl starch, hydroxypropyl starch, carboxymethyl starch, methyl-alpha-D-glucoside, and combinations of these.

BACKGROUND OF THE INVENTION

This invention relates to the preparation of stable aqueous polymer emulsions.

More particularly, this invention relates to the preparation of aqueous vinyl acetate polymer and copolymer emulsions stabilized with starch based protective colloid forming substances. The preparation of the vinyl acetate polymer and copolymer emulsions have been known for many years. Such emulsions are described in U.S. Pats. No. 2,401,445, 2,485,796 and British Patent No. 580,020. The general characteristics and make-up of such emulsions is as follows: The poly [vinyl acetate] emulsions are fluid, milk-white high solids dispersions of polyvinyl acetate in water.

The procedures used to prepare vinyl acetate polymer emulsions generally involve the mixing of the vinyl acetate (or monomers) with water, emulsifying agents, a polymerization catalyst and a protective colloid.

The reaction mixture is then heated to polymerization temperature with agitation and continued heating until the reaction is completed. The emulsion polymers can be used for many purposes such as paints, and various adhesive applications.

In order to obtain the desired emulsion characteristics, the polymerization (reaction) conditions should be carefully defined. For example, the monomer concentration, addition rate, reaction temperature, protective colloid and the catalyst concentrations should be carefully controlled to achieve the desired properties in the final product. These factors are well known to those working in this art.

The emulsion polymer has a solids content of about 50 to about 58 percent based on the total weight. Vinyl acetate monomer polymerizes by the free radical addition reaction. Free radicals generated by the decomposition of organic peroxides such as benzoyl peroxide (or ammonium persulfate) are commonly used to initiate polymerization. The polymerizations ordinarily are accomplished at temperatures above room temperature.

Following is the vinyl acetate polymerization reaction:

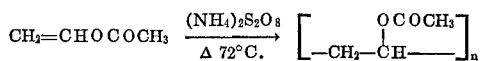

"$n$" can be an integer from about 465 to about 930 and the average molecular weight of this product is about 40,000 to about 80,000.

As previously indicated, a protective colloid forming substance is generally employed in the emulsion polymerization procedure. The most common protective colloid forming substances are the following:

(1) The partially and fully hydrolyzed poly [vinyl alcohols].

(2) Natural and synthetic gums.

(3) Poly [hydroxy ether] compounds such as methyl cellulose, hydroxyethyl cellulose, ethyl hydroxyethyl cellulose, etc.

These substances are soluble in water and give viscous solutions which display the properties of a typical lyophilic colloid medium. The protective colloid forming substances are often referred to as thickeners, but their effect on the emulsion polymer system is more complex than is indicated by this term.

These materials also function as dispersion and emulsion system stabilizers and are frequently referred to as protective colloid forming agents. Methyl cellulose, hydroxyethyl cellulose and poly [vinyl alcohols] are frequently used protective colloid forming substances. Water soluble methyl celluloses are available commercially in several molecular weight ranges.

The methyl celluloses are soluble in cold water, but they precipitate from hot solutions. The precipitation temperature depends on the composition and concentration of the system, but precipitation usually occurs in the range of 50 to 75° C. Hydroxyethyl celluloses also precipitate from solution when heated, but the precipitation temperature is higher than for the methyl cellulose, i.e., about 85° C.

The high viscosity 80% hydrolyzed poly [vinyl acetate] poly [vinyl alcohols] are excellent emulsion stabilizers, but precipitate when borates are present in the composition.

SUMMARY OF THE INVENTION

The following starch based protective colloid forming substances are useful in aqueous vinyl acetate polymer and copolymer emulsions: hydroxyethyl starch, hydroxypropyl starch, carboxymethyl starch, methyl alpha-D-glucoside, and mixtures of these. A combination of any two of these materials works better than any single one alone. The hydroxyethyl and hydroxypropyl starch solutions have greater heat stability than the cellulose ethers and they do not precipitate from their aqueous solutions on heating at temperatures of up to about 85 to 90° C. The starch derivatives can be used for the preparation of heat-stable emulsion polymers. Furthermore, the starch derivatives can also be used for the preparation of borax-tolerant emulsion polymers. No precipitating out of solution occurs at borax concentrations of up to about 3 parts by weight borax per 97 parts by weight polymer.

DETAILED DESCRIPTION

Hydroxypropyl starch, when incorporated into poly [vinyl acetate] emulsion polymer systems results in an emulsion polymer which forms a tough, flexible clear film when left on glass to dry. Similarly, a combination of hydroxyethyl and hydroxypropyl starches can be used. The amount of the protective colloid generally ranges from about 0.2 to about 4% by weight, based on the amount of the polymer. Carboxymethyl starch and methyl-alpha-D-glucoside also can be employed in the emulsion polymerization systems of this invention.

According to the invention the vinyl emulsion polymerization reaction is carried out in an aqueous system containing the vinyl acetate monomer, potassium persulfate catalyst, alkyl phenoxy polyoxyethylene ethanols (Igepal) emulsifying agents, and a protective colloid selected from the group hydroxyethyl starch, hydroxypropyl starch, carboxymethyl starch, and methyl-alpha-D-glucoside, or a combination of these.

The highest film strength is obtained with hydroxyethyl and hydroxypropyl starch combinations. The flexibility of the films is attributed in part to the plasticizing effect of these protective colloids. It is therefore an object of the present invention to provide commercially useful aqueous poly [vinyl acetate] emulsion polymers containing starch derivatives as protective colloids. These emulsion polymers form a tough, flexible clear film when hydroxyethyl or hydroxypropyl starches or a combination of the two are employed.

Hydroxyethyl starch is made by treating an alkaline starch complex with propylene oxide.

Carboxymethyl starch is made by treating an alkaline starch complex with sodium chloracetate.

Methyl-alpha-D-glucoside is made by reacting glucose and methanol in the presence of hydrochloric acid catalyst.

The degree of substitution of the foregoing materials is about 0.05 to about 0.75 hydroxyethyl or hydroxypropyl groups per anhydroglucose unit. The amount of protective colloid is about 0.2 to about 4 percent based on the weight of the vinyl acetate monomer.

The surfactant solution is used for the purpose of promoting an intimate contact between the immiscible reactants. About 5 to about 10 percent surfactant by weight based on the weight of the vinyl acetate monomer is used. Suitable surfactants include: polyethoxylated lauryl alcohol (available from Alcolac Chemical Corporation as Sipex L25) and ABEX VA-40 surfactant (also available from Alcolac).

The catalyst is used in an amount of from about 0.12 to about 0.3 percent by weight of the vinyl acetate monomer. In addition to potassium persulfate, other catalysts, such as ammonium persulfate and benzoyl peroxide are useful.

The sodium bisulfite solution is used for activating the free radical addition reaction. About 0.005 to about 0.008 percent by weight of bisulfite (activator) based on the weight of the vinyl acetate monomer is used. Sodium sulfite also is suitable for this function.

The following examples are illustrative of the products and processes of the present invention, but are not to be construed as limiting.

EXAMPLE I

Solution A—Hydroxyethyl and hydroxypropyl starch solution 2.5 g. of hydroxypropyl starch and 1.0 g. of hydroxyethyl starch are dissolved in 130 ml. of distilled water. The hydroxyethyl and hydroxypropyl starches are cold water soluble highly substituted materials, having a degree of substitution (D.S.) of approximately 0.65 hydroxyethyl group per anhydroglucose unit (HE/AGU) and 0.7 hydroxypropyl group per anhydroglucose unit (HP/AGU).

Solution B—Surfactant solution 10 g. of IGEPAL CO 630, 15 g. of IGEPAL CO 970 and 0.3 g. of sodium bicarbonate are dissolved in approximately 100 ml. of distilled water. IGEPAL CO 630 and IGEPAL CO 970 are surfactants made by Antara Chemical (General Aniline and Film Corp.).

Solution C—Catalyst solution 0.3 g. of potassium persulfate ($K_2S_2O_8$) is dissolved in approximately 8–10 ml. of distilled water.

Solution D—Sodium bisulfite solution 0.002 g. of sodium bisulfite ($NaHSO_3$) is dissolved in 2 ml. of distilled water.

Procedure: In a 1000 ml. capacity resin pot equipped with a reflux condenser, mechanical stirrer, nitrogen inlet and a thermometer is placed 130 ml. of Solution A, 100 ml. of Solution B and the system is purged with nitrogen gas for 15 minutes at a moderate rate. In the next step approximately 30 ml. of vinyl acetate monomer is introduced into the reactor with continued stirring, followed by 4 ml. of Solution C and 2 ml. of Solution D. Heat is then applied to the reactor and the temperature is maintained at 72–74° C. An additional 230 ml. of vinyl acetate is added drop-wise to the reaction over a period of 2½ hrs. Simultaneously, the addition of the catalyst Solution C is begun and completed in approximately one hour. The reaction mixture is refluxed for approximately two more hours to completion of the reaction.

The emulsion polymer is cooled to room temperature and filtered through a cheesecloth. The pH of the emulsion is adjusted to 5. It has a solids content of 52%. The emulsion polymer forms a tough, flexible clear film when left on glass to dry. The tensile strength of product is measured and compared with poly [vinyl acetate] film controls prepared without hydroxypropyl starches. The product has approximately 10 to 20% higher tensile strength. The emulsion polymer also can be used in the preparation of adhesives, as shown in Table I following.

EXAMPLE II

The procedure is the same as in Example I except Solution A contains only 3 g. of hydroxyethyl starch. The product forms a tough, flexible clear film on drying.

EXAMPLE III

The entire procedure of Example I is again repeated in every detail in this example except Solution A contains 4.2 g. of hydroxypropyl starch. The product forms a tough, flexible film on paper.

EXAMPLE IV

The procedure is the same as Example III except that the surfactant solution comprises 15 g. of IGEPAL CO 630, 15 g. of IGEPAL 887, 2 g. of IGEPAL CO 970 and 0.5 g. of sodium bicarbonate dissolved in 120 ml. of distilled water. IGEPAL 887 is a surfactant made by Antara Chemicals (General Aniline and Film Corp.).

EXAMPLE V

The procedure is the same as in Example I except Solution A contains 2 g. of drum dried carboxymethyl starch and 2 g. of methyl-alpha-D-glucoside in 140 ml. of distilled water.

EXAMPLE VI

The procedure is the same as in Example V except that Solution A contains only 2 g. of carboxymethyl starch in 125 ml. of water.

EXAMPLE VII

The procedure is the same as Example I except that 210 ml. of vinyl acetate and 30 ml. of ethyl acrylate monomers are used in the emulsion copolymerization reaction.

EXAMPLE VIII

The entire procedure of Example I is again repeated in every detail in this example except that Solution A contains the following materials: 1 g. of methyl-alpha-D-glucoside, 1 g. of hydroxyethyl starch and 1.5 g. of hydroxypropyl starch dissolved in 128 ml. of distilled water.

EXAMPLE IX

The procedure is the same as in Example I except that Solution A contains only 3.6 g. of carboxymethyl starch in 134 ml. of distilled water.

Two types of carboxymethyl starches are used in these examples. These are a pregelled (dum-dried) carboxymethyl starch containing approximately 0.05 carboxymethyl group per anhydroglucose unit (1.8 g.), and a cold water soluble type carboxymethyl starch containing approximately 0.3 carboxymethyl group per anhydroglucose unit (1.8 g.). These different types of starches are used as emulsion system stabilizers and viscosity controllers. Since the less highly substituted granular derivatives are not directly soluble in cold water, they are rendered so before use by pregelatinizing on hot rolls (drum-drying).

TABLE I

Instron tensile strength determination of the poly [vinyl acetate] starch derivative films (on ⅛ in. strips)

| Materials | Tensile strength in grams | Film thickness, in. |
|---|---|---|
| Control: PVAc film—no additives (50% solids) | 220 | 0.5/1000 |
| Do | 219 | 0.5/1000 |
| PVAc and 2% H.E. starch film | 270 | 0.5/1000 |
| Do | 310 | 0.5/1000 |
| PVAc and 2% H.P. starch film | 480 | 0.5/1000 |
| PVAc and 1% H.E.S. plus 1.5% H.P.S. film | 500 | 0.5/1000 |

NOTES.—H.E.S.=hydroxyethyl starch.
H.P.S.=hydroxypropyl starch.
PVAc=poly [vinyl acetate].

The film thickness of the samples was measured on a TMI Model 551 micrometer and found to be identical with the controls (approximately 0.5/1000 in.).

The compositions of Examples I–IX do not precipitate from solution at temperatures of up to 194° F. (90° C.). Also when up to 3% borax by weight is present in the solution, no precipitation occurs.

What is claimed is:

1. The method of making a stabilized aqueous vinyl acetate polymer capable of forming a film of high tensile strength, which comprises the steps of:

forming an aqueous reaction mixture containing an emulsion polymer-forming material selected from the group consisting of vinyl acetate monomer and vinyl acetate copolymer forming monomers, catalyst for said polymer-forming material, and a protective colloid selected from the group consisting of hydroxypropyl starch and a mixture of hydroxypropyl starch and hydroxyethyl starch, and effecting an emulsion polymerization of said reaction mixture, said protective colloid being present in amount of about 0.2 to about 4% based on the weight of the polymer-forming material and being present to stabilize the emulsion, prevent precipitation at elevated temperatures and in the presence of borax in solution, and to impart said high tensile strength.

2. The method according to claim 1 wherein said protective colloid is present in an amount from about 1.3% to about 4% based on the weight of vinyl acetate.

3. The method according to claim 1 wherein said protective colloid has a degree of substitution of about 0.05 to about 0.75.

4. The method according to claim 1 wherein the polymerization reaction is effected to the extent of forming vinyl acetate polymer having an average molecular weight of about 40,000 to about 80,000.

5. The product formed by the process according to claim 1.

6. The product formed by the process according to claim 2.

7. The product formed by the process according to claim 3.

8. The product formed by the process according to claim 4.

References Cited
UNITED STATES PATENTS

| | | | |
|---|---|---|---|
| 3,386,933 | 4/1968 | Genzabella | 260—17.4 ST |
| 3,632,535 | 1/1972 | Gramera et al. | 260—17.4 ST |
| 2,458,191 | 1/1949 | Nichols et al. | 260—17.4 ST |
| 2,444,396 | 6/1948 | Collins et al. | 260—17.4 ST |
| 3,092,619 | 6/1963 | Koehler et al. | 260—231 |
| 3,293,241 | 12/1966 | Francis | 260—233.3 |

WILLIAM H. SHORT, Primary Examiner

E. WOODBERRY, Assistant Examiner

U.S. Cl. X.R.

117—161; 260—89.1